United States Patent
Ayoub

(10) Patent No.: US 11,953,121 B2
(45) Date of Patent: Apr. 9, 2024

(54) EXTERNAL PLUMBING VALVE DEVICE

(71) Applicant: Nour Ayoub, Streamwood, IL (US)

(72) Inventor: Nour Ayoub, Streamwood, IL (US)

( * ) Notice: Subject to any disclaimer, the term of this patent is extended or adjusted under 35 U.S.C. 154(b) by 75 days.

(21) Appl. No.: 17/707,765

(22) Filed: Mar. 29, 2022

(65) Prior Publication Data
US 2022/0307613 A1    Sep. 29, 2022

Related U.S. Application Data

(60) Provisional application No. 63/167,215, filed on Mar. 29, 2021.

(51) Int. Cl.
*F16K 5/04* (2006.01)
*F16K 5/06* (2006.01)

(52) U.S. Cl.
CPC .......... *F16K 5/0442* (2013.01); *F16K 5/0647* (2013.01)

(58) Field of Classification Search
CPC .. F16K 5/0442; F16K 5/0647; Y10T 137/698; E03C 1/042; E03B 9/025
USPC .................................................. 137/359–360
See application file for complete search history.

(56) References Cited

U.S. PATENT DOCUMENTS

| | | | | |
|---|---|---|---|---|
| 1,508,056 A * | 9/1924 | Jansen | .................. | F16K 11/083 137/359 |
| 1,562,981 A * | 11/1925 | Muend | .................... | F16K 27/12 251/222 |
| 1,619,748 A * | 3/1927 | Muend | ..................... | F16K 27/12 251/221 |
| 1,655,796 A * | 1/1928 | Murphy | .................. | F16L 15/02 134/167 C |
| 2,617,442 A * | 11/1952 | Bohren | .................... | E03C 1/042 137/360 |
| 3,331,386 A * | 7/1967 | Politz | ........................ | E03C 1/04 137/359 |
| 3,380,472 A * | 4/1968 | Leighton | ............... | F16K 5/0242 251/288 |
| 6,345,643 B1 * | 2/2002 | Ko | ........................ | E03C 1/0401 137/359 |
| 6,367,507 B1 * | 4/2002 | Legeai | ..................... | F16L 41/16 137/884 |

* cited by examiner

*Primary Examiner* — John Bastianelli

(57) ABSTRACT

An external plumbing valve device is provided having an exterior structural portion. The exterior structural portion may have an outer body with an elongate shape and a hollow cavity therein. The outer body may have a horizontal portion having a first end terminating at a proximal end of the outer body and a second end terminating at a distal end of the outer body. The second end may terminate into a vertical portion of the outer body. The exterior structural portion may have a stem disposed within the hollow cavity in a manner parallel to the outer body. The exterior structural portion may have a handle disposed at the proximal end of the outer body. The plumbing valve device may have an interior structural portion with a valve disposed at the distal end of the outer body within the vertical portion and a plurality of coupling mechanisms.

19 Claims, 7 Drawing Sheets

EXTERNAL PLUMBING VALVE DEVICE

CROSS-REFERENCE TO RELATED APPLICATIONS

This application claims priority to U.S. Provisional Patent Application Ser. No. 63/167,215, entitled "External Plumbing Valve Device," filed Mar. 29, 2021. The contents of this application are hereby incorporated by reference in their entirety.

BACKGROUND OF THE INVENTION

The United States census consistently reported that more than 99 percent of homes have indoor plumbing. With such ubiquitous use of indoor plumbing, operational issues related to the use of indoor plumbing naturally arise. In fact, any physical structure with indoor plumbing is inherently at risk of experiencing one or more plumbing emergency events. Such emergency events may include a pipe leak, a valve malfunction, metal corrosion issues, the inability to turn water flow on/off and the like. Remediation of such emergency events by a plumbing contractor typically costs several thousands of dollars. Moreover, insurance companies pay out multiple billions of dollars each year to homeowners for water damage coverage. In practical terms, it is estimated that over ten thousand residential plumbing emergency events of varying severity occur each day.

Given documented shortages in the overall workforce, but particularly in skilled manual labor, a residential homeowner in need of remediation of a plumbing emergency event may not be able to quickly obtain the services of a competent plumber. This provides a need for the residential homeowner to have a temporary stopgap solution that may be easily and immediately implemented in the event of a plumbing emergency event. Further, given documented supply chain issues, replacement parts that a competent plumber may require in order to remediate a plumbing emergency event may not be immediately available which will prolong the period of time it will take to remediate the plumbing emergency event. This provides an additional incentive for the residential homeowner to have access to means of self-remediating the plumbing emergency event.

Further, many plumbing emergency events occur at or adjacent to a water outlet element such as a faucet, sink, shower, toilet, hose and the like. However, it is often the case that a residential homeowner cannot access the adjacent plumbing of the water outlet element because the adjacent plumbing is disposed behind a permanent unmovable fixture such as drywall, a backsplash, cabinets, shower tiles, floorboards and the like. Accessing the adjacent plumbing would be burdensome and costly and therefore drives up the cost of services of a plumber. This provides a need for the residential homeowner to be provided easy access to the plumbing adjacent the water outlet element.

Therefore, it would be advantageous to provide an external plumbing valve device that allows a residential homeowner to self-remediate many plumbing emergency events. Further, it would be advantageous to provide an external plumbing valve device that allows a residential homeowner to easily shut off or turn on the flow of water to the given water outlet element without the need to remove any permanent unmovable fixture. Moreover, it would be advantageous to provide an external plumbing valve device that utilizes a valve element that is robust to long-term use, harsh use, misuse and the like or any combination thereof in order to serve as a reliable failsafe in the event of a plumbing emergency. Additionally, it would be advantageous to utilize an external plumbing valve device that allows with minimal effort a residential homeowner to manually shut off a water supply to an improperly functioning appliance while not requiring the water supply to the entire residence to be shut off which thereby allows use of the still properly functioning appliances.

DETAILED DESCRIPTION OF THE INVENTION

Figure 1:
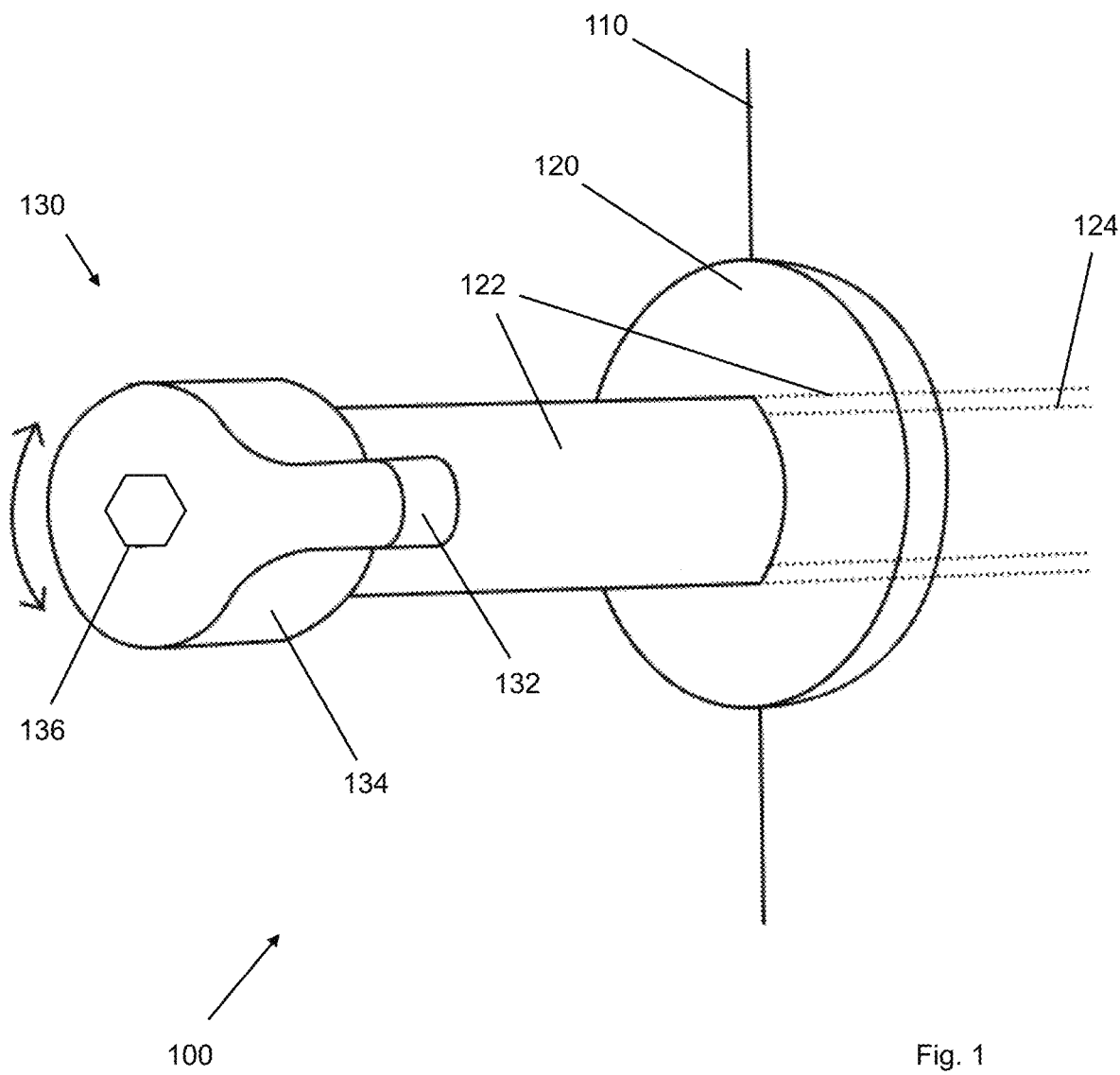
FIG. 1 is a perspective view of an exterior portion of an external plumbing valve device partially disposed through a wall in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "an external plumbing valve device" also includes a plurality of external plumbing valve devices and the like.

In some embodiments, an external plumbing valve device is provided, comprising an exterior structural portion comprising an outer body comprising an elongate shape having a hollow cavity therein; and a horizontal portion having a first end terminating at a proximal end of the outer body and a second end terminating at a distal end of the outer body, wherein the second end terminates into a vertical portion of the outer body; a stem disposed within the hollow cavity in a manner parallel to the outer body; and a handle disposed at the proximal end of the outer body; an interior structural portion, comprising a valve disposed at the distal end of the outer body within the vertical portion; and a first coupling mechanism disposed at a first end of the vertical portion of the outer body and a second coupling mechanism disposed at a second end of the vertical portion of the outer body.

In some embodiments, the exterior structural portion comprises the proximal end of the outer body.

In some embodiments, the exterior structural portion comprises a majority of the length of the horizontal portion of the outer body.

In some embodiments, the exterior structural portion is structured for disposition in front of an indoor building structure.

In some embodiments, the interior structural portion comprises the distal end of the outer body.

In some embodiments, the interior structural portion comprises the vertical portion of the outer body.

In some embodiments, the interior structural portion is structured for disposition behind an indoor building structure.

In some embodiments, the elongate shape and the hollow cavity are cylindrical in shape.

In some embodiments, the horizontal portion of the outer body is permanently coupled to the vertical portion of the outer body such that the horizontal portion is arranged orthogonal to the vertical portion.

In some embodiments, the stem is coupled to the handle at the proximal end.

In some embodiments, the stem is coupled to the valve at the distal end.

In some embodiments, the stem terminates at the distal end within the vertical portion of the outer body.

In some embodiments, the handle comprises a base structure having a top portion and a side portion, wherein the side portion is arranged orthogonal to the top portion.

In some embodiments, the handle comprises a lever grip extending from the side portion of the base structure.

In some embodiments, the handle is coupled to the proximal end of the stem.

In some embodiments, the valve is coupled to the distal end of the stem; and the valve is secured between a top portion seat and a bottom portion seat.

In some embodiments, the first and second coupling mechanisms are structured to couple to respective first and second portions of existing plumbing conduit; and the first and second portions of existing plumbing conduit are respectively coupled via sweat connection or threaded connection to the first and second coupling mechanisms.

In some embodiments, the handle is rotatable and structured to have torque applied thereto which manipulates the valve between open and closed positions.

Exemplary embodiments of the present invention are illustrated in the accompanying figures. As shown in FIG. 1, a perspective view of an exterior portion of an external plumbing valve device 100 partially disposed through a wall 110 is provided. The external plumbing valve device 100 may comprise an exterior portion disposed on an exterior side of a wall 110 and an interior portion disposed on an interior side of the wall 110.

The wall 110 may be any suitable building structure such as, but not limited to, building walls, room walls, flooring, tiling and like indoor building structures or any combination thereof. The wall 110 may exist to provide structural support for the building but may also be utilized to hide unsightly utility elements such as, but not limited to, pipes, ductwork, electrical wiring and the like or any combination thereof. To that end, the exterior portion of the external plumbing valve device 100 may be disposed on the exterior side of the wall 110 in order to provide access to a user while also appearing as an aesthetically appealing element. Further, the interior portion of the external plumbing valve device 100 may be disposed on the interior side of the wall 110 in order to hide the aesthetically unappealing utility pipes that the external plumbing valve device 100 couples to via a T-joint illustrated in FIG. 2.

The exterior portion of the external plumbing valve device 100 may comprise an escutcheon flange cover plate 120 that serves to secure an elongate main body 122 to the coupling with the wall 110 while also covering the aesthetically unappealing coupling point. The elongate main body 122 may comprise an outer body having a proximal end and a distal end. The outer body may comprise any suitable shape such as, but not limited to, cylindrical, rectangular, triangular and the like or any combination thereof. The proximal end of the outer body may terminate into a rotatable handle 130. The distal end of the outer body may terminate into the T-joint of FIG. 2 on the interior side of the wall 110.

The exterior portion of the external plumbing valve device 100 may further comprise a stem 124 that may be disposed within and adjacent to the outer body 122 such that the stem 124 is disposed parallel relative the outer body 122. While the outer body 122 and the stem 124 may each be any suitable shape, the outer body 122 and the stem 124 preferably each comprise at least the same categorical shape and, more preferably, the outer body 122 and the stem 124 may each comprise an elongate cylindrical shape of roughly the same length but the outer body 122 may have a larger diameter width than the stem 124.

Figure 2:
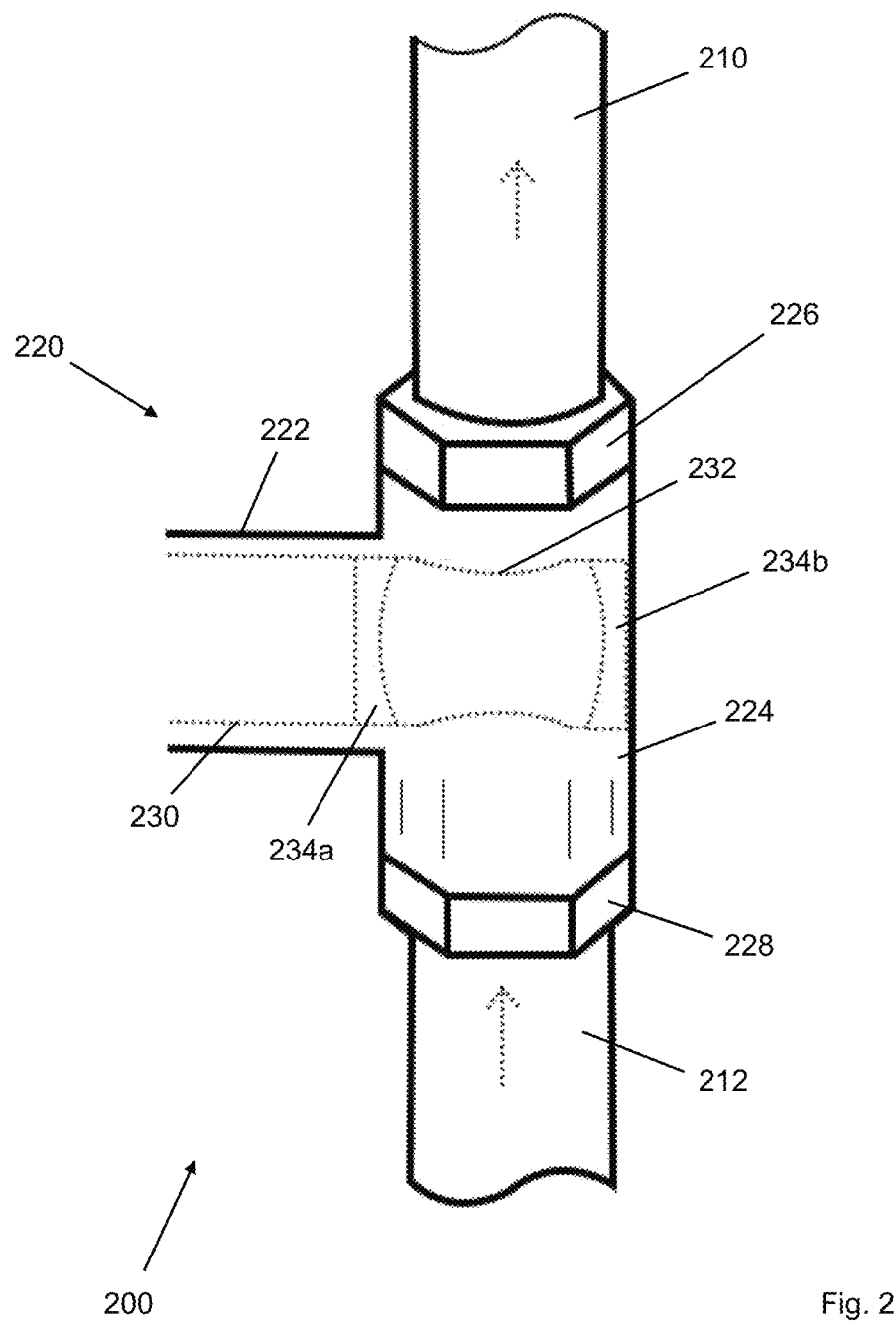
FIG. 2 is an overview of an interior portion of an external plumbing valve device disposed behind a wall in accordance with some embodiments of the present invention.

The stem 124 at a distal end terminates into a rotatable valve illustrated in FIG. 2 and at a proximal end terminates into a rotational leverage point 136 of the rotatable handle 130. Further, the distal end of the stem 124 may be disposed on the interior side of the wall 110. By rotation of the rotatable handle 130 over the rotational leverage point 136, the stem 124 may rotate the rotatable valve in order to shut off or allow water flow through the existing utility pipe disposed behind the wall 110.

The rotatable handle 130 collectively may comprise a lever grip 132, a base structure 134 and the leverage point 136. The lever grip 132 may comprise an elongate shape that extends from a portion of the base structure 134. Specifically, the lever grip 132 may extend from a side portion of the base structure 134, where the base structure 134 may comprise the side portion and a top portion that is arranged in a plane orthogonal to that of the side portion. Preferably, the side portion of the base structure 134 may comprise the same or similar shape as that selected for the outer body 122 and stem 124. More preferably, the side portion of the base structure 134 may comprise a generally cylindrical shape but for the area adjacent to the coupling point between the lever grip 132 and the base structure 134.

The top portion of the base structure 134 may comprise an aperture that is shaped to accept the leverage point 136 therethrough. The leverage point 136 may be shaped in any suitable manner such that it allows the torque applied to the lever grip 132 to be applied to the leverage point 136 with an efficient transfer of energy therebetween. Preferably, the torque transfer efficiency between the lever grip 132 and the leverage point 136 may be at least 90% in order to provide the user with ease of use of the rotatable handle 130.

The handle 130 may rotate in a synchronous manner relative the stem 124. In some embodiments, the handle 130 may rotate through an angle of at least 90 degrees relative the outer body 122. Alternatively, the handle 130 may rotate through an angle of at least 180 degrees relative the outer body 122. The stem 124, the handle 130, the lever grip 132, the base structure 134 and the leverage point 136 may rotate independently from that of the wall 110, the flange cover plate 120 and the outer body 122.

As shown in FIG. 2, an overview of an interior portion of an external plumbing valve device 200 disposed behind a wall is provided. The external plumbing valve device 200 may comprise an exterior portion disposed on an exterior side of a wall and an interior portion disposed on an interior side of the wall. The interior portion of the external plumbing valve device 200 is illustrated in FIG. 2 along with a first portion of existing plumbing conduit 210 and a second portion of existing plumbing conduit 212 between which the external plumbing valve device 200 is coupled.

The interior portion of the external plumbing valve device 200 may comprise a T-joint 220 coupled between the first and second plumbing conduits 210, 212 as illustrated in FIG. 2. The T-joint 220 may comprise a horizontal outer body portion 222 and a vertical outer body portion 224 which may be disposed orthogonal relative one another. Specifically, the horizontal outer body portion 222 may be disposed in parallel with a stem 230 while the vertical outer body portion 224 may be disposed in parallel with the first and second plumbing conduits 210, 212.

The vertical outer body portion 224 may be coupled between the first and second plumbing conduits 210, 212 via associated first and second coupling mechanisms 226, 228. Specifically, the first and second coupling mechanisms 226, 228 may couple together the first and second plumbing conduits 210, 212 to opposing ends of the vertical outer body portion 224 using either threaded or sweat connection coupling mechanisms.

A threaded connection utilizes one or more coupling mechanisms having complimentary threads fabricated into terminal ends of the elements to be coupled together in order to tighten a sealing ring disposed therebetween. In some instances, a threaded connection may be advantageous to utilize in the case where assembly of the external plumbing valve device 200 is not expected to be long-term permanent but rather might be reused elsewhere or replaced in the near to mid-term. Further, a threaded connection may be advantageous in cases where a rotatable valve aperture 232 might need to be fine-tuned to properly functionally align with the flow of fluid through the first and second plumbing conduits 210, 212. Additionally, a threaded connection may be advantageous in cases where the heat required for a sweat connection would damage adjacent or nearby structural elements such as plastic pipe components or other material not robust to high temperatures.

A sweat connection utilizes overlapping non-threaded conduit terminal ends that are hot soldered together whereby the hot solder seeps into the gap between the overlapping non-threaded conduit terminal ends and fuses them together to provide a fluid seal. In some instances, a sweat connection may be advantageous to utilize in the case where assembly of the external plumbing valve device 200 is expected to be long-term permanent in nature or where it would be inconvenient to measure a threaded pipe connection to length. In the context of the present invention, a sweat connection may be advantageous to utilize where a plumber or homeowner is installing the external plumbing valve device 200 after the existing plumbing conduit has been installed but rather is being modified to have the device 200 installed between the first and second plumbing conduits 210, 212. Further, a sweat connection may be advantageous to utilize where the plumber or homeowner installing the device 200 is comfortable using hot soldering techniques as a sweat connection requires less time for installation than a threaded connection.

The stem 230 is illustrated in dotted line phantom in FIG. 2 to represent that the stem 230 is contained within the structure of the horizontal and vertical outer body portions 222, 224. The stem 230 may comprise a proximal end that is disposed on an exterior side of a wall and a distal end that is disposed behind an interior side of the wall. The distal end of the stem 230 may comprise a rotatable valve aperture 232 that allows the maximum flow of fluid therethrough when in an open position and allows no flow of fluid thorough when in a closed position. Generally, the degree to which the valve aperture 232 allows fluid to flow therethrough is proportional to the degree to which the stem 230 is rotated between the open and closed positions.

With reference to FIG. 1, the stem 230 may be rotated by torque being applied to a handle contained within an exterior portion of the external plumbing valve device 200 disposed on an exterior side of the wall. Thereby, the valve aperture 232 may be rotated accordingly in a manner that is synchronous with that of the stem 230 and the handle. The stem 230 at its distal end may form a fluid seal with an interior surface of the vertical outer body portion 224, thereby allowing the stem 230 and valve aperture 232 to allow or stop the flow of fluid therethrough based upon the rotational position of the valve aperture 232. A top and bottom seat portion 234a, 234b may secure the rotatable valve and associated aperture 232 in place and may further allow the rotatable valve to uniformly rotate in place without deviating from its position after long-term iterative use. This allows the external plumbing valve device 200 to be functionally robust to iterative rotation so that the valve aperture 232 properly functions in both open and closed positions.

Figure 3:
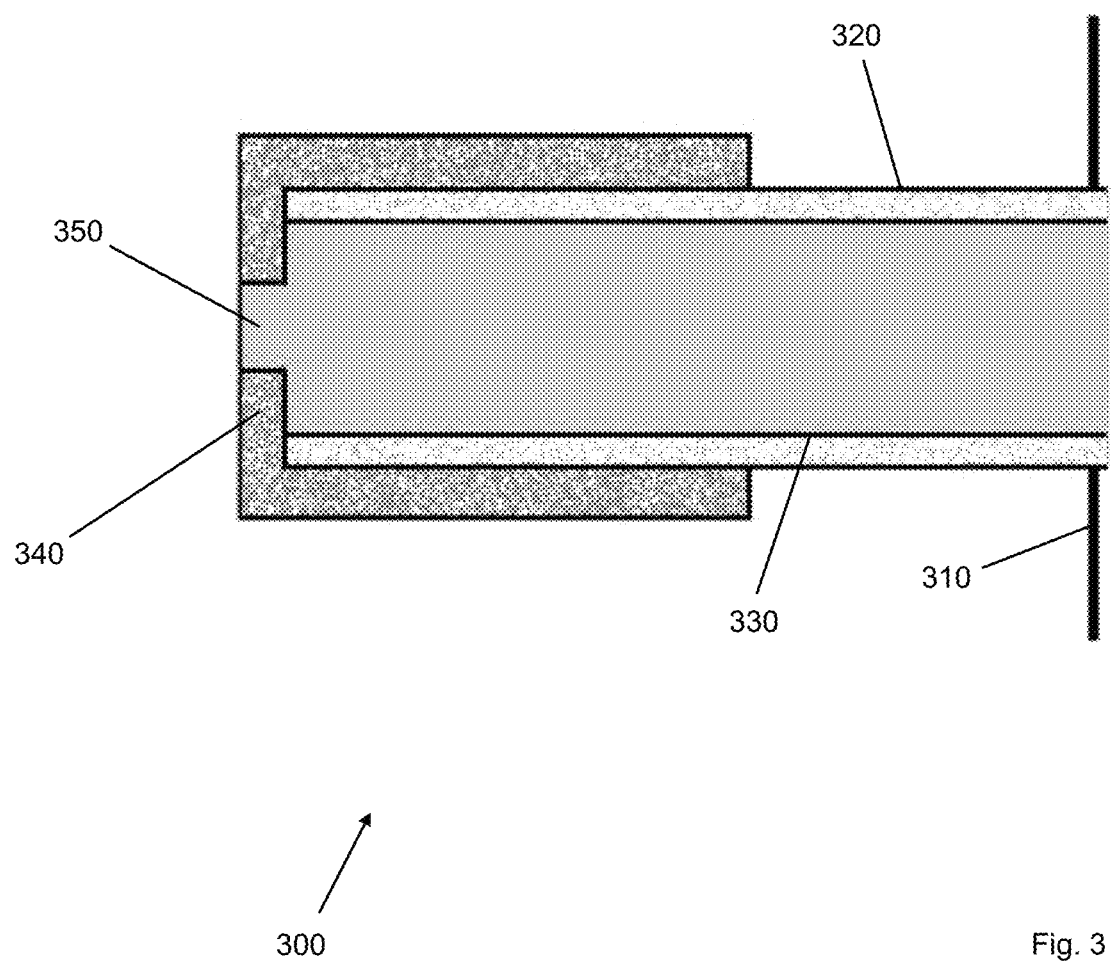
FIG. 3 is a cross-sectional view of an exterior portion of an external plumbing valve device partially disposed through a wall in accordance with some embodiments of the present invention.

As shown in FIG. 3, a cross-sectional view of an exterior portion of an external plumbing valve device 300 partially disposed through a wall 310. The external plumbing valve device 300 may comprise an outer body 320 disposed through the wall 310. The outer body 320 may symmetrically enclose a stem 330 running therethrough and also extending through the wall 310.

The external plumbing valve device 300 may further comprise a base structure 340 forming a portion of a handle of the device 300. The base structure 340 may symmetrically enclose both of the outer body 320 and the stem 330, but the base structure 340 may not extend through the wall 310. Further, the base structure 340 may only enclose a portion of the outer body 320 and the stem 330 due to the outer body 320 and the stem 330 preferably being elongate in nature and extending out from the wall far enough to allow a user to easily grasp and actuate the handle of the external plumbing valve device 300.

Moreover, while the base structure 340 could enclose the entirety of the exterior portions of the outer body 320 and the stem 330, it would be advantageous that base structure 340 only enclose a fractional portion of the outer body 320 and the stem 330 so that material production cost may be reduced while still achieving the same end functionality. Additionally, by reducing the material used in the base structure 340, the user may more easily actuate the handle given there is less material to torque for successful actuation of the handle.

The base structure 340 may symmetrically enclose the outer body 320 and the stem 330 both along horizontal and vertical axes. Specifically, a horizontal portion of the base structure 340 may partially enclose the horizontally aligned portions of the outer body 320 and stem 330 while a vertical portion of the base structure 340 may at least partially enclose the vertically aligned portions of the outer body 320 and stem 330. The vertical portion of the base structure 340 may enclose a leverage point 350 extending from a proximal end of the stem 330.

The vertical and horizontal portions of the base structure 340 may serve to provide an aesthetic appeal to the external plumbing valve device 300 while also providing an adequate amount of surface area to couple the base structure 340 to the outer body 320 and the stem 330. Further, the vertical portion of the base structure 340 may serve as a torque transfer mechanism from the torque applied to the handle and transferred to the leverage point 350 which in turn rotates the stem 330 and a valve disposed at a distal end of the stem 330. Based upon the amount of rotation of the valve, a commensurate amount of fluid is allowed to or is prevented from flowing therethrough.

While the base structure 340 is illustrated in FIG. 2 as being disposed horizontally over roughly half of the exterior portion of the outer body 320, it is understood that the base structure 340 may be disposed over more or less than half of the exterior portion of the outer body 320. Preferably, the base structure 340 may comprise a length value that is less than a length value of the exterior portion of the outer body 320. In other words, the base structure 340 may preferably enclose less than half the length of the exterior portion of the outer body 320. In order to make the external plumbing valve device 300 easily accessible to the user, the exterior portion of the device 300 should adequately extend outward from the wall 310 so that the user may easily grasp and manipulate the device 300. Therefore, it would be highly advantageous for the base structure 340 to enclose less than half the length of the exterior portion of the outer body 320 so as to minimize the material required and cost involved in fabricating the device 300.

Figure 4A:
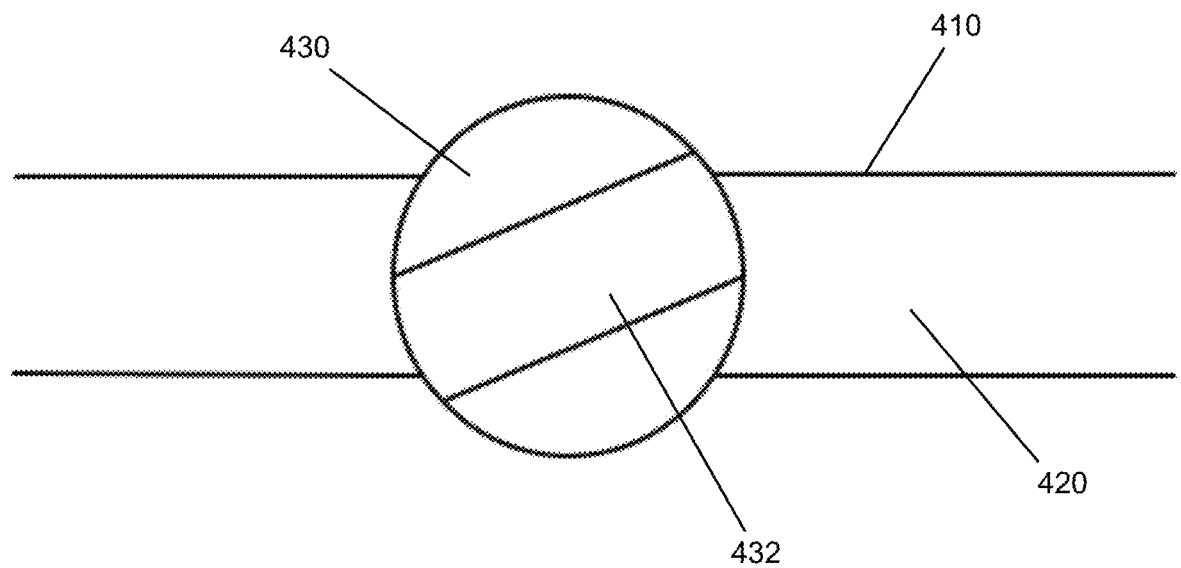
FIG. 4A is a cross-sectional view of a ball valve of an external plumbing valve device disposed behind a wall in accordance with some embodiments of the present invention.
Figure 4A:

As shown in FIG. 4A, a cross-sectional view of a ball valve 400A of an external plumbing valve device disposed behind a wall is provided. The ball valve 400A may comprise an inner surface of a plumbing conduit body 410 defining a cylindrical cavity 420 therein. Further, the ball valve 400A may comprise a rotatable valve 430 having a fluid flow aperture 432 disposed therethrough. In some embodiments, the rotatable valve 430 may rotate through an angle of at least 90 degrees relative the inner surface of the plumbing conduit body 410. Alternatively, the rotatable valve 430 may rotate through an angle of at least 180 degrees relative the plumbing conduit body 410.

In order to control the flow of fluid through the cylindrical cavity 420, the rotatable valve 430 may rotate between an open position and a closed position. The open position, fluid is allowed to flow through the cylindrical cavity 420. In the closed position, fluid is not allowed to flow through the cylindrical cavity 420. In rotating between the open and closed positions, the valve 430 may rotate through an angle of at least 90 degrees relative the plumbing conduit body 410. Moreover, the degree to which the valve 430 is rotated may dictate the degree to which the fluid is permitted to flow through the cylindrical cavity 420. For instance, if the valve 430 were to be rotated 45 degrees such that it is placed halfway between the open and closed positions, then the fluid flow aperture 432 may permit half the maximum fluid flow therethrough. Alternatively, in this case, the fluid flow aperture 432 may permit another fluid flow value proportional to the rotation of the valve 430.

Figure 4B:
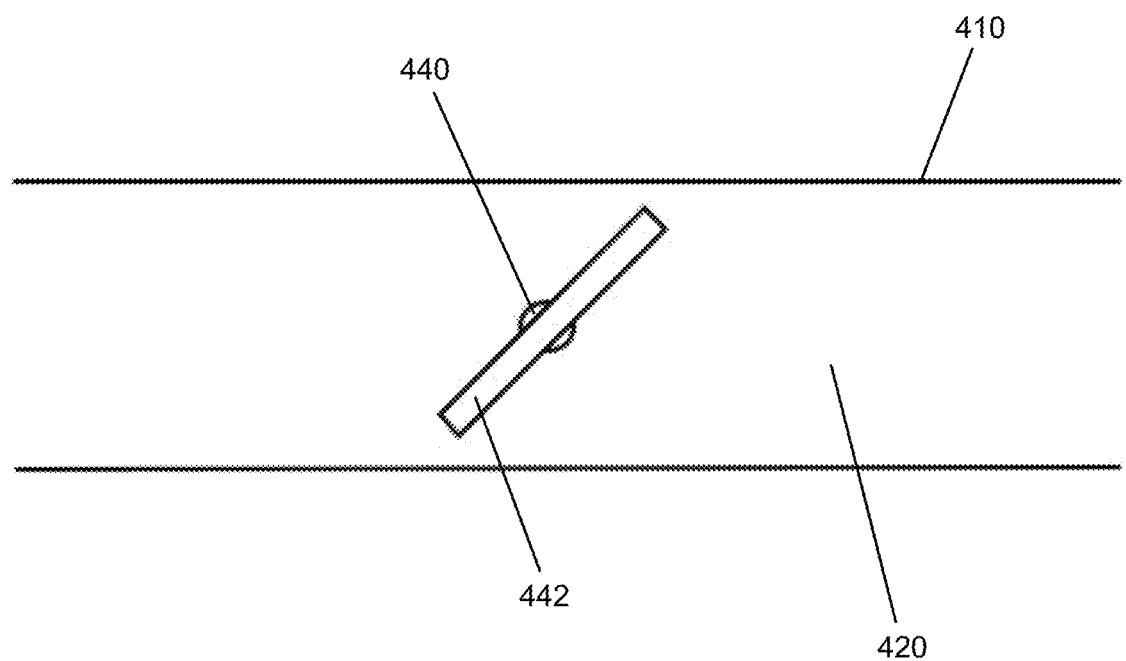
FIG. 4B is a cross-sectional view of a butterfly valve of an external plumbing valve device disposed behind a wall in accordance with some embodiments of the present invention.
Figure 4B:

As shown in FIG. 4B, a cross-sectional view of a butterfly valve 400B of an external plumbing valve device disposed behind a wall is provided. The butterfly valve 400B may comprise an inner surface of a plumbing conduit body 410 defining a cylindrical cavity 420 therein. Further, the butterfly valve 400B may comprise a rotatable stem 440 having a fluid flow flange 442 disposed therethrough. In some embodiments, the rotatable stem 440 may rotate through an angle of at least 90 degrees relative the inner surface of the plumbing conduit body 410. Alternatively, the rotatable stem 440 may rotate through an angle of at least 180 degrees relative the plumbing conduit body 410.

Figure 4C:
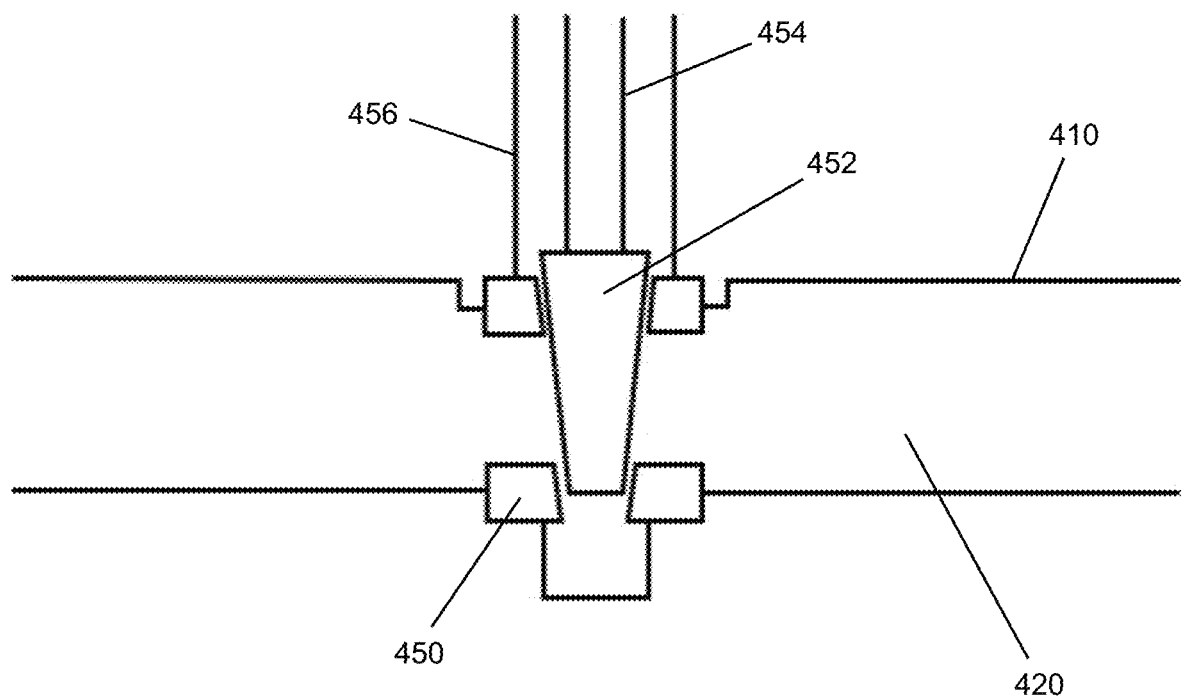
FIG. 4C is a cross-sectional view of a gate valve of an external plumbing valve device disposed behind a wall in accordance with some embodiments of the present invention.

As shown in FIG. 4C, a cross-sectional view of a gate valve 400C of an external plumbing valve device disposed behind a wall is provided. The gate valve 400C may comprise an inner surface of a plumbing conduit body 410 defining a cylindrical cavity 420 therein. Further, the gate valve 400C may comprise a plurality of sealing elements 450 which form a fluid seal with a gate plunger 452. The gate plunger 452 may be deployed and withdrawn via a stem 454 disposed within a conduit body 456. In the deployed position, the fluid flow may be stopped via a fluid seal being formed by the sealing elements 450 and the gate plunger 452. In the withdrawn position, the fluid flow may be fully allowed to pass through the cylindrical cavity 420.

Figure 5:
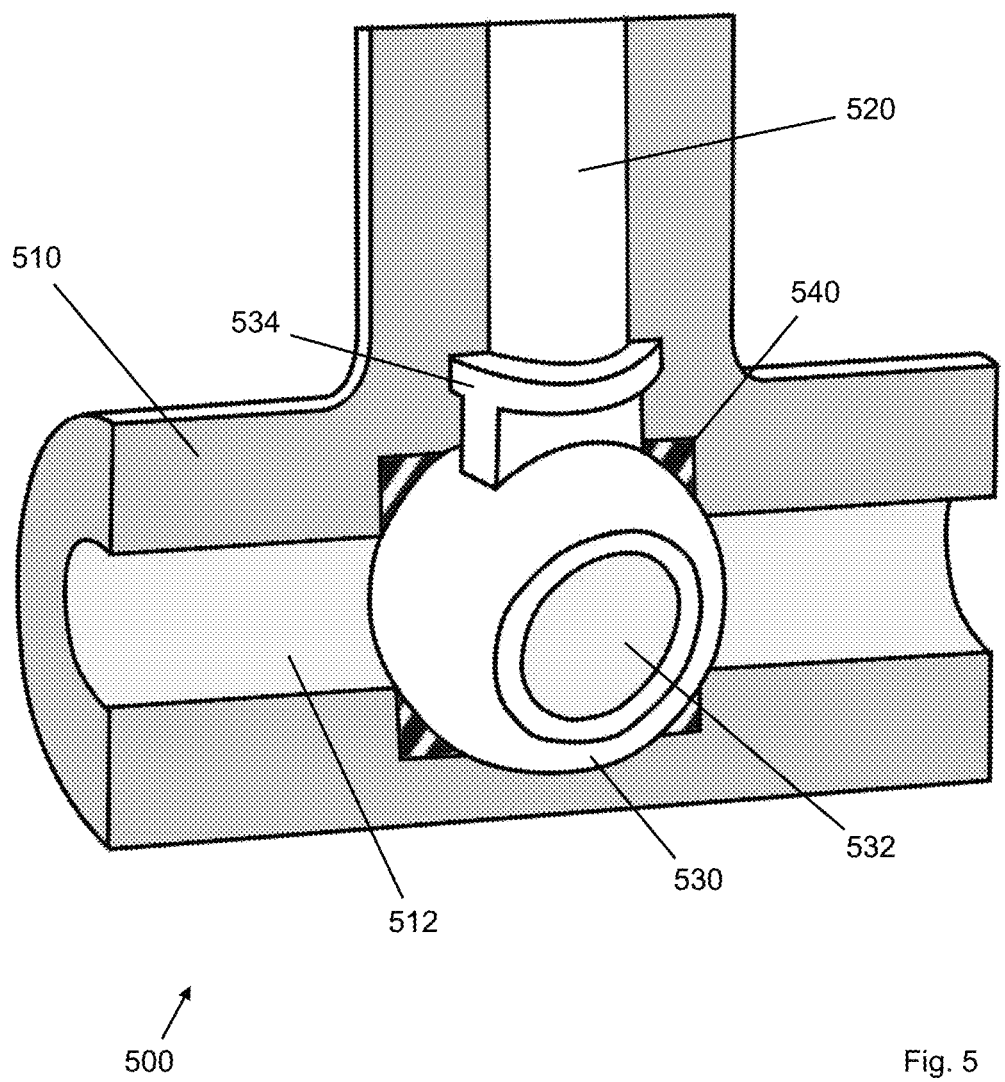
FIG. 5 is a partial cross-sectional view of an external plumbing valve device utilizing an extended stem and a ball valve in accordance with some embodiments of the present invention.

As shown in FIG. 5, a partial cross-sectional view of an external plumbing valve device 500 utilizing an extended stem 520 and a ball valve 530 disposed behind a wall is provided. The external plumbing valve device 500 may be disposed within a plumbing conduit body 510 having a cavity 512 disposed therein. Further, the external plumbing valve device 500 may comprise an extended stem 520 having a first end terminating at a ball valve 530 and at a second end terminating at a handle (not shown) disposed external to the wall. The extended stem 520 may be coupled to the ball valve 530 via a flange 534.

The ball valve 530 may comprise a conduit passageway 532 disposed through the body of the ball valve 530 as shown in FIG. 5. Further, the ball valve 530 may be secured in place within the cavity 512 of the conduit body 510 via a seat 540 that is structurally robust to wear and corrosion while still having a low enough coefficient of friction with the ball valve 530 so as to allow it to rotate upon a user manipulating the ball valve 530 between open and closed states. Specifically, in use, the user may actuate the handle disposed external to the wall which causes rotation of the extended stem 520 and consequently rotation of the ball valve 530 between open and closed states.

With reference to FIGS. 1-5, the outer body and stem may be fabricated from any material robust to corrosive elements found in water. Specifically, the outer body and stem may be fabricated from any of brass, bronze, copper, aluminum, cast iron, ductile iron, stainless steel and similar steel alloys, PVC, CPVC and the like or any combinations thereof. Copper-based materials such as, but not limited to, brass would be preferable to utilize for the outer body and stem given their resistance to corrosion from harsh elements found in some local water supplies. In some instances, aluminum, stainless steel or PVC may be utilized as a more cost-effective option for the outer body and stem where the fluids being passed therethrough have low corrosive characteristics.

With further reference to FIGS. 1-5, the valve may be fabricated from any material robust to corrosive elements found in water. Further, the valve material should be resistant to becoming corrosively bound to the outer body and thereby preventing is movement relative thereto. Specifically, the valve may be fabricated from any of stainless steel and similar steel alloys, PVC, CPVC and the like or any combinations thereof. Such materials not only provide a cost-effective solution but also are highly resistant to becoming bound to different materials such as many copper-based materials.

Generally, the external plumbing valve device is useful when an appliance such as, but not limited to, a faucet, a shower head, a toilet or the like breaks or malfunctions and thereby continues to consume water volume from a water supply even when the appliance is not in use. Worse yet, such a situation can lead to costly and/or dangerous water damage to a building structure which may yield hazardous conditions such as mold or weakened structural supports.

In the case of such plumbing emergency events, it would be advantageous to utilize an external plumbing valve device of the present invention as opposed to shutting off the entire water supply to the building. Specifically, the external plumbing valve device may be utilized to selectively shut off only those appliances that are improperly consuming water volume. This allows the remainder of the properly functioning appliances to continue to be used without a concern for the improperly functioning appliance.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase 'removably coupled' and similar terms and phrases are intended to convey that a given element may be iteratively coupled to and removed from another given element as desired. For example, a male plug of a first extension cord may be removably coupled to a female plug of a second extension cord as desired.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. An external plumbing valve device, comprising:
an exterior structural portion and an interior structural portion, wherein the exterior and interior structural portions are disposed on opposing sides of a building wall structure;
the exterior structural portion, comprising:
a conduit body fabricated from chlorinated PVC, comprising:

an elongate shape having a hollow cavity therein; and
a horizontal conduit portion having a first end terminating at a proximal end of the conduit body and a second end terminating at a distal end of the conduit body, wherein the second end terminates into a vertical conduit portion of the conduit body;
a stem disposed within the hollow cavity in a manner parallel to the conduit body, wherein the stem is fabricated from chlorinated PVC; and
a handle disposed at the proximal end of the conduit body, wherein the handle is coupled to the stem via a rotational leverage point allowing the handle to rotate about the rotational leverage point;
the interior structural portion, comprising:
a ball valve disposed at the distal end of the conduit body within the vertical conduit portion, wherein:
the ball valve is coupled to the handle via the stem and the rotational leverage point,
the stem is coupled to the ball valve via a coupling flange,
the handle, the rotational leverage point, the stem, the coupling flange and the ball valve all rotate together through a 90 degree rotational angle, and
the ball valve is fabricated from chlorinated PVC;
the ball valve rotates between a top portion seat and a bottom portion seat, wherein:
the top portion seat and the bottom portion seat each comprise a concave surface shape and are recessed into an inner surface of the conduit body adjacent the hollow cavity, and
both the top and bottom portion seat are corrosion-resistant and comprise a coefficient of friction value low enough to allow the ball valve to rotate therebetween; and
a first coupling mechanism disposed at a first end of the vertical conduit portion of the conduit body and a second coupling mechanism disposed at a second end of the vertical conduit portion of the conduit body.

2. The external plumbing valve device of claim 1, wherein the exterior structural portion comprises the proximal end of the conduit body.

3. The external plumbing valve device of claim 1, wherein the exterior structural portion is structured for disposition in front of an indoor building structure.

4. The external plumbing valve device of claim 1, wherein the interior structural portion comprises the distal end of the conduit body.

5. The external plumbing valve device of claim 1, wherein the interior structural portion comprises the vertical conduit portion of the conduit body.

6. The external plumbing valve device of claim 1, wherein the interior structural portion is structured for disposition behind an indoor building structure.

7. The external plumbing valve device of claim 1, wherein the elongate shape and the hollow cavity are cylindrical in shape.

8. The external plumbing valve device of claim 1, wherein the horizontal conduit portion of the conduit body is permanently coupled to the vertical conduit portion of the conduit body such that the horizontal conduit portion is arranged orthogonal to the vertical conduit portion.

9. The external plumbing valve device of claim 1, wherein the stem is coupled to the handle at the proximal end.

10. The external plumbing valve device of claim 1, wherein the stem is coupled to the valve at the distal end.

11. The external plumbing valve device of claim 1, wherein the stem terminates at the distal end where the horizontal conduit portion terminates into the vertical conduit portion of the conduit body.

12. The external plumbing valve device of claim 1, wherein the handle comprises a base structure having a top portion and a side portion, wherein the side portion is arranged orthogonal to the top portion.

13. The external plumbing valve device of claim 12, wherein the handle comprises a lever grip extending from the side portion of the base structure.

14. The external plumbing valve device of claim 1, wherein the handle is coupled to the proximal end of the stem.

15. The external plumbing valve device of claim 1, wherein:
the valve is coupled to the distal end of the stem; and
the valve is secured between a top portion seat and a bottom portion seat.

16. The external plumbing valve device of claim 1, wherein:
the first and second coupling mechanisms are structured to couple to respective first and second portions of existing plumbing conduit; and
the first and second portions of existing plumbing conduit are respectively coupled via sweat connection or threaded connection to the first and second coupling mechanisms.

17. The external plumbing valve device of claim 1, wherein the handle is rotatable and structured to have torque applied thereto which manipulates the valve between open and closed positions.

18. An external plumbing valve device, comprising:
an exterior structural portion and an interior structural portion, wherein the exterior and interior structural portions are disposed on opposing sides of a building wall structure;
the exterior structural portion, comprising:
a conduit body fabricated from chlorinated PVC, comprising:
an elongate shape having a hollow cavity therein; and
a horizontal conduit portion having a first end terminating at a proximal end of the conduit body and a second end terminating at a distal end of the conduit body, wherein the second end terminates into a vertical conduit portion of the conduit body;
a stem disposed within the hollow cavity in a manner parallel to the horizontal conduit portion of the conduit body and orthogonal to the vertical conduit portion of the conduit body, wherein the stem is fabricated from chlorinated PVC; and
a handle disposed at the proximal end of the conduit body, wherein the handle is coupled to the stem via a rotational leverage point allowing the handle to rotate about the rotational leverage point;
the interior structural portion, comprising:
a ball valve disposed at the distal end of the conduit body within the vertical conduit portion, wherein:
the ball valve is coupled to the handle via the stem and the rotational leverage point,
the stem is coupled to the ball valve via a coupling flange, the handle, the rotational leverage point, the stem, the coupling flange and the ball valve all rotate together through a 90 degree rotational angle, and the ball valve is fabricated from chlorinated PVC;

the ball valve rotates between a top portion seat and a bottom portion seat, wherein:

the top portion seat and the bottom portion seat each comprise a concave surface shape and are recessed into an inner surface of the conduit body adjacent the hollow cavity, and both the top and bottom portion seat are corrosion-resistant and comprise a coefficient of friction value low enough to allow the ball valve to rotate therebetween; and a first coupling mechanism disposed at a first end of the vertical conduit portion of the conduit body and a second coupling mechanism disposed at a second end of the vertical conduit portion of the conduit body.

19. An external plumbing valve device, comprising:

an exterior structural portion and an interior structural portion, wherein the exterior and interior structural portions are disposed on opposing sides of a building wall structure;

the exterior structural portion, comprising:

conduit body fabricated from chlorinated PVC, comprising:

an elongate shape having a hollow cavity therein; and a horizontal conduit portion having a first end terminating at a proximal end of the conduit body and a second end terminating at a distal end of the conduit body, wherein the second end terminates into a vertical conduit portion of the conduit body;

a stem disposed within the hollow cavity in both the horizontal conduit portions and the termination point of the horizontal conduit portion into the vertical conduit portion of the conduit body, wherein:

the stem is disposed parallel to the horizontal conduit portion of the conduit body and orthogonal to the vertical conduit portion of the conduit body, and the stem is fabricated from chlorinated PVC; and a handle disposed at the proximal end of the conduit body, wherein the handle is coupled to the stem via a rotational leverage point allowing the handle to rotate about the rotational leverage point;

the interior structural portion, comprising:

a ball valve disposed at the distal end of the conduit body within the vertical conduit portion, wherein:

the ball valve is coupled to the handle via the stem and the rotational leverage point, the stem is coupled to the ball valve via a coupling flange, the handle, the rotational leverage point, the stem, the coupling flange and the ball valve all rotate together through a 90 degree rotational angle, and the ball valve is fabricated from chlorinated PVC;

the ball valve rotates between a top portion seat and a bottom portion seat, wherein:

the top portion seat and the bottom portion seat each comprise a concave surface shape and are recessed into an inner surface of the conduit body adjacent the hollow cavity, and both the top and bottom portion seat are corrosion-resistant and comprise a coefficient of friction value low enough to allow the ball valve to rotate therebetween; and a first coupling mechanism disposed at a first end of the vertical conduit portion of the conduit body and a second coupling mechanism disposed at a second end of the vertical conduit portion of the conduit body.

* * * * *